Aug. 11, 1936.  C. B. GOODSPEED  2,050,656
RAILWAY CAR TRUCK
Filed April 5, 1932  4 Sheets-Sheet 2
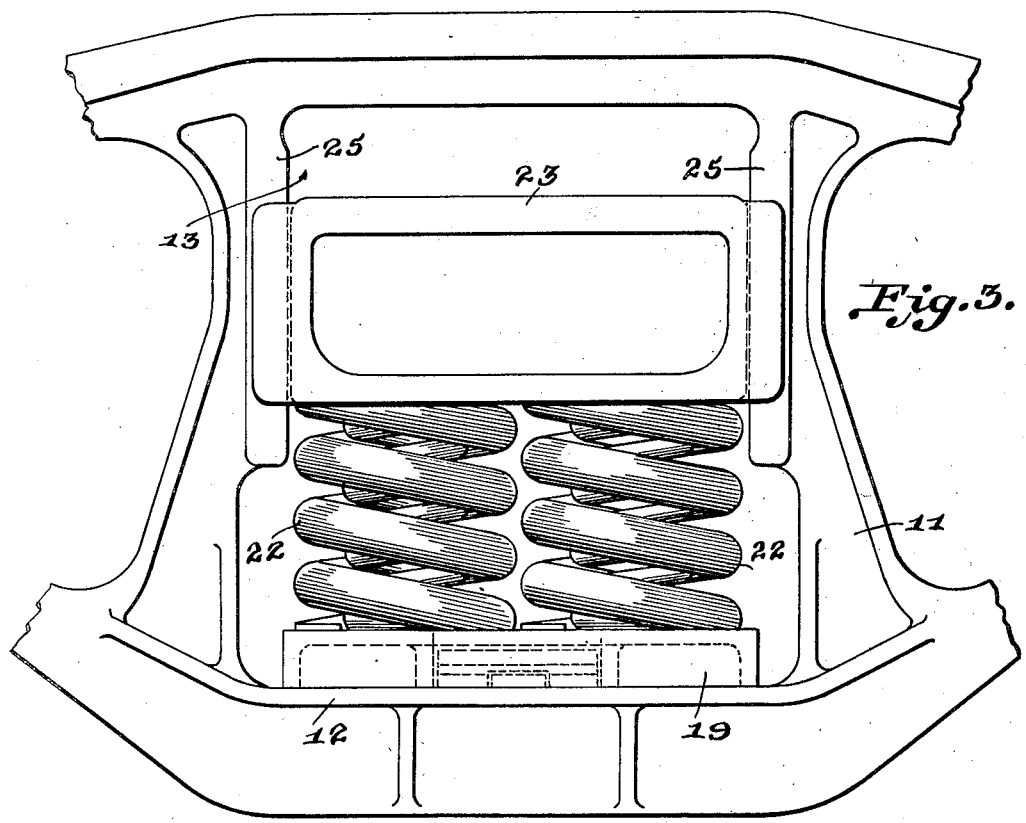
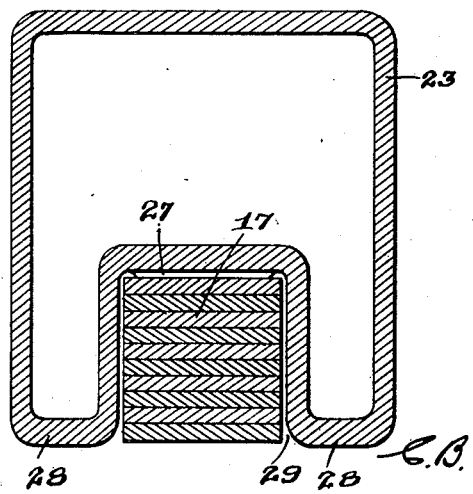

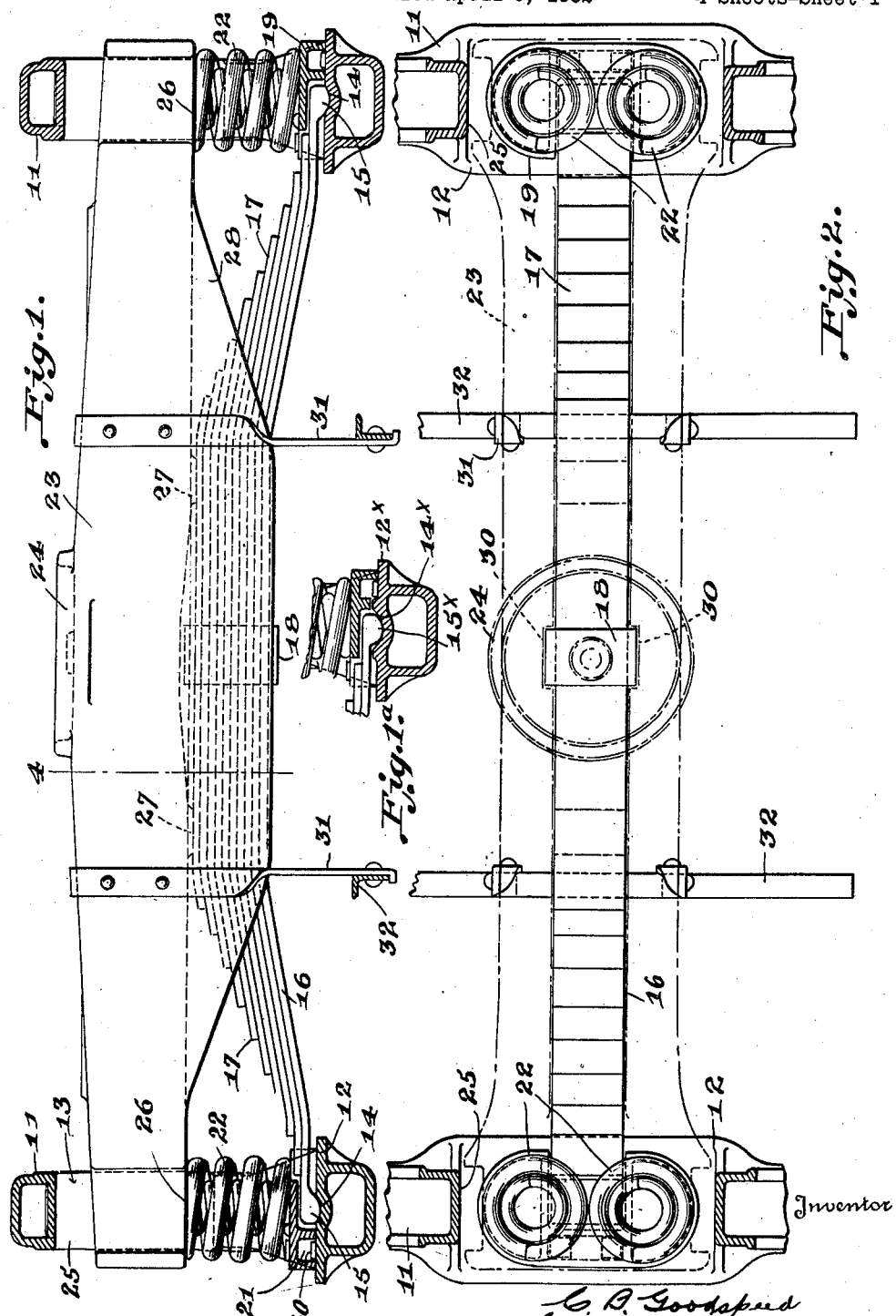

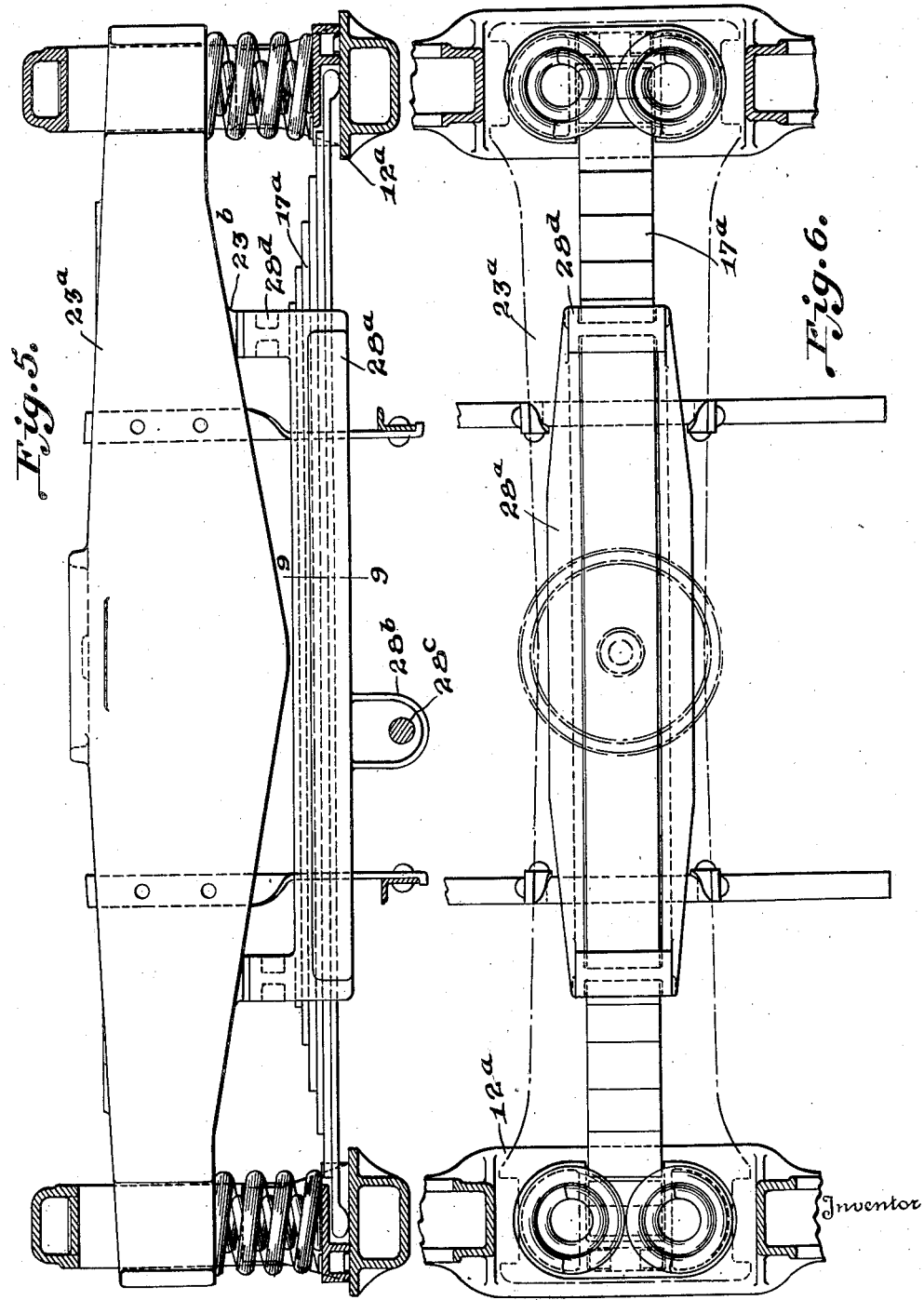

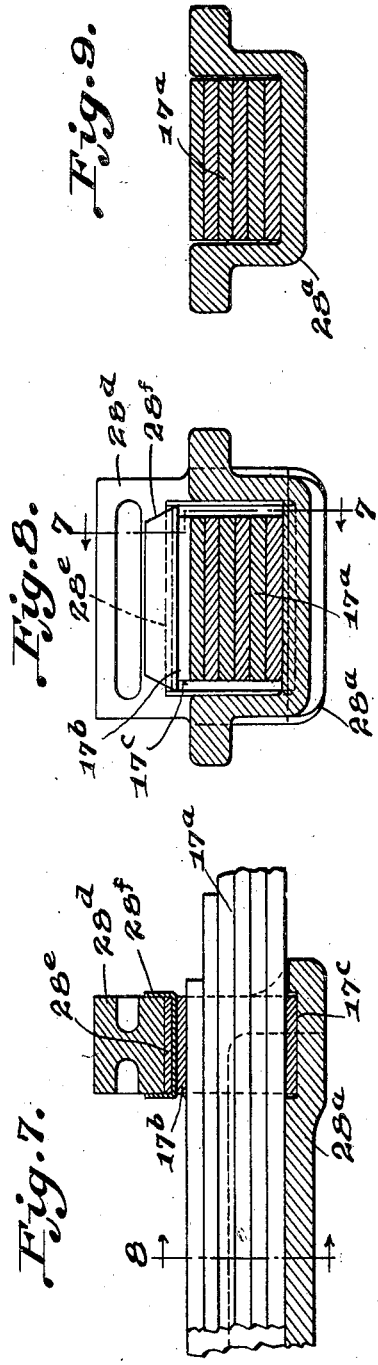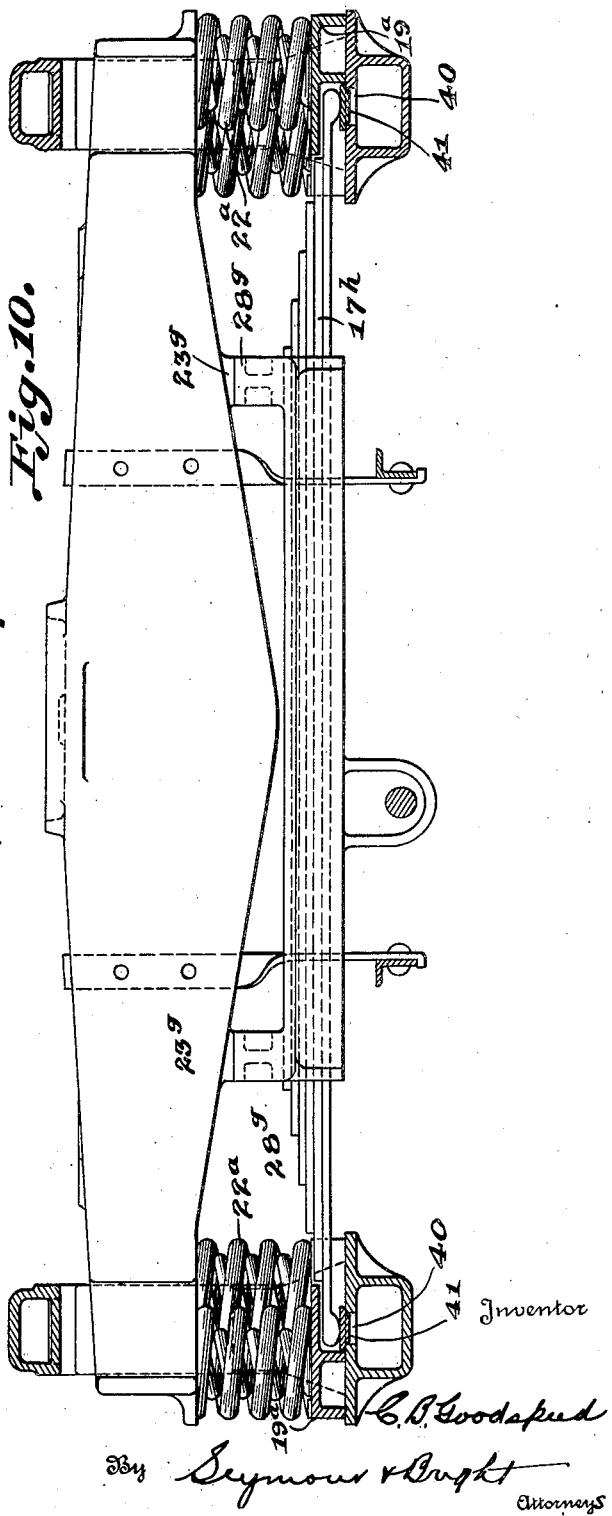

Patented Aug. 11, 1936

2,050,656

UNITED STATES PATENT OFFICE 2,050,656

RAILWAY CAR TRUCK

Charles B. Goodspeed, Chicago, Ill., assignor to The Buckeye Steel Castings Company, Columbus, Ohio Application April 5, 1932, Serial No. 603,374

24 Claims. (Cl. 105—197.1)

This invention relates to railway car trucks especially adapted for the present day high-speed movement of freight and the like.

Practically all freight car bodies or platforms are supported on coil or helical springs which constitute the entire means for resiliently supporting a car body and its lading. It is known that coil springs absorb very little of the work of compression applied to the springs, and as a result, at certain car speeds known as "critical speeds", the period of vibration of coil springs coincides with impulses to the wheels, due to passing over rail joints and other track irregularities. This causes the amplitude of the springs to build up and results in excessive "dancing" of car bodies on the springs, which sometimes drives the coils solid, and in general results in damage to the car and its contents and to the rails.

One of the principal objects of the present invention is to provide novel means for combining laminated springs into the resilient support ensemble for the car body and lading.

Another object is to provide means in a car truck for loading such a laminated spring at more than one point to thereby increase its load carrying capacity.

A further object is to furnish means for partially housing the laminated spring which will act as a safety support for the brake rigging of a car truck.

Another object is to supply means for supporting a car truck bolster intermediate its ends.

Another principal object is to provide a spring seat for the coil springs of a car truck, separate from the spring seat of the laminated spring.

A still further object is to furnish a car truck side frame of known construction with a spring seat arranged at the opening in the conventional side frame spring seat.

Another object is to supply a car truck of known type in which a laminated supporting spring is substituted for the usual spring plank.

With the foregoing objects outlined and with other objects in view which will appear as the description proceeds, the invention consists in the novel features hereinafter described in datail, illustrated in the accompanying drawings, and more particularly pointed out in the appended claims.

In the drawings,

Fig. 1 is a side elevation of a novel form of bolster and laminated spring shown spanning the space between the side frames of a car truck, such frames being shown in transverse vertical section.

Fig. 1a is a modification of a portion of the structure shown in Fig. 1.

Fig. 2 is a top plan view of the structure shown in Fig. 1, with parts in horizontal section and other parts in dot and dash lines, to facilitate illustration.

Fig. 3 is an end elevation of the parts shown in Fig. 1.

Fig. 4 is a vertical sectional view of a detail on the line 4—4 of Fig. 1.

Figs. 5 and 6 are views respectively like Figs. 1 and 2, but showing a modification in which the bolster is of conventional design.

Fig. 7 is a sectional view of a detail of the construction shown in Fig. 5, and taken on the line 7—7 of Fig. 8.

Fig. 8 is a sectional view on the line 8—8 of Fig. 7.

Fig. 9 is a sectional view on the line 9—9 of Fig. 5.

Fig. 10 is a view like Fig. 5, but illustrating a further modification in which the laminated spring structure is substituted for the conventional spring plank.

Referring first to the embodiment of the invention illustrated in Figs. 1, 2, 3, and 4, 11 designates car truck side frames which are supported by journal boxes that rest on the conventional axle and wheel assemblies, (not shown).

In accordance with the invention, the spring seat portion 12, positioned at the bottom 13 of the bolster opening of each side frame is provided with a curved recess 14 to receive the curved head 15 formed at the outer end of one of the leaves 16 of a laminated semi-elliptical spring 17. The medial portions of the leaves of the laminated spring, in this embodiment of the invention, are held together by a spring band 18.

At this point it will be noted that the concaved surface 14 might be placed at the end of the laminated spring in place of in the spring seat, and in that arrangement, the convex surface 15 would be part of the seat 12.

Coil spring seats 19 preferably cover the ends of the laminated spring and are held in interlocked relation with the side frames by any suitable means. For example, the seat portions 12 may have upwardly projecting lugs 20 that detachably engage recesses 21 in the seats 19.

Resting on the seats 19 are coil springs 22, and in accordance with the invention, the laminated spring 17 as well as the coil springs 22, function to support the load. These springs act in unison or parallel, and they are all supported by the side frame. The laminated spring may be so arranged that it will come into action before the coil springs, or just the reverse. The springs may also be arranged to come into action simultaneously.

In either event, the springs support a bolster 23 having a conventional center plate 24 upon which the car body, (not shown) rests.

The ends of the bolster extend through the bolster openings 13, and are interlocked with the columns 25 of the side frames in any desired way. The ends of the bolster rest on the springs 22 through the instrumentality of the ordinary spring seats 26, and intermediate the seats 26, the bolster has a pair of spaced auxiliary seats 27 that rest upon the top of the laminated spring 17.

In the form of the invention shown in Figs. 1, 2, 3, and 4, the bolster is of special construction, and it has depending legs 28 so that a portion of the bolster is of inverted U-shaped cross section, as illustrated in Fig. 4. This special shaping of the bolster provides a recess 29 at its under side that extends lengthwise of the bolster and acts as a housing for a portion of the laminated spring. At the central portion of this housing there are recesses 30, as shown in Fig. 2, to accommodate the spring band 18.

Brackets 31 are secured to the bolster and support bars 32. This provides safety supports for brake beams, not shown.

It will be noted that the bottoms of the side frames on each side of the truck are held in substantially spaced relation by the laminated spring, somewhat after the manner of the usual spring plank. Furthermore, the spring supports 19 interlock with the lugs 20, and this arrangement retains the laminated spring against horizontal displacement.

In the modification in Fig. 1a, the recess 14x of the spring support 12x is shown wider than the spring end 15x, which will allow relative movement between these two parts when deflection of the laminated spring takes place.

The operation of such a truck may be briefly described as follows:

The car body rests on the truck bolster 23 which is resiliently supported by the springs 17 and 22 supported by the side frames 11. The bolster load is transferred to the laminated spring preferably at two points 27, rather than at the center only, as the former increases the load carrying capacity of the spring 17 and also supports the bolster to better advantage.

A laminated spring dissipates a portion of the work of spring compression and prevents spring oscillations of the coil springs from building up and damaging the car and contents.

In the modification illustrated in Figs. 5 to 9 inclusive, the bolster 23a is of conventional design, except for pads 23b through which the laminated spring 17a is loaded. A housing 28a of channel-shape cross section partially encloses the laminated spring and has depending therefrom an integral loop 28b which acts as a safety support for the usual bottom brake lever connector 28c. At each end of the housing, the spring 17a is entirely surrounded by the housing which has upstanding extensions 28d to engage the bolster pads 23b. Spring bands 17b in this embodiment, hold the leaves of the laminated spring together and extend into recesses 17c in the housing 28a, and they bear at their upper ends against the extensions 28d. For locking the laminated spring and housing together, a removable plate 28e is inserted after the spring 17a and housing 28a are in relative positions. A retainer 28f is then inserted to hold the plate in position.

In this embodiment, the ends of the laminated spring may rest on flat surfaces 12a of the spring seat portions of the side frame.

In the modification shown in Fig. 10, I propose a truck in which the laminated spring 17h is introduced into existing trucks by the simple expedient of removing the spring plank and substituting a laminated spring assemblage of the type shown in Figs. 5 to 9 inclusive, in its place.

However, as the spring seat portions of most side frames of existing trucks have openings 40 at locations where it is desirable to seat the ends of the laminated springs, I place over these openings, caps 41 which are interlocked with the side frames and provide full bearing surfaces for the ends of the laminated spring.

The upstanding extensions 28g of the spring housing in this case may be shaped to directly engage the bottom of the bolster, or pads 23g may be rigidly connected to the bolster and seat on said extensions.

The proper center plate height of existing trucks is maintained in this embodiment by making space available for the spring supports 19a through the medium of using coil springs 22a of less height than those previously used in the truck, and by utilizing the space gained by dispensing with the spring plank.

From the foregoing it is believed that the construction, operation and advantages of the invention may be readily understood by those skilled in the art, and it is apparent that changes may be made in the details disclosed, without departing from the spirit of the invention, as expressed in the claims.

What is claimed and desired to be secured by Letters Patent is:

1. In a railway car truck comprising side frames having upper and lower members connected by column members to form a bolster opening, a laminated spring positioned transversely of the car truck and resting on said lower members of the side frames, load supporting means, and additional springs positioned in the bolster opening of said side frames, all of said springs resiliently supporting said load supporting means.

2. In a railway car truck comprising side frames having upper and lower members connected by column members to form a bolster opening, a laminated spring positioned transversely of the car truck and resting on said lower members of the side frames, load supporting means, and additional springs positioned in the bolster opening of said side frames, all of said springs resiliently supporting said load supporting means, the load supporting means resting on said laminated spring at spaced points.

3. In a railway car truck comprising side frames having upper and lower members connected by column members to form a bolster opening, a laminated spring positioned transversely of the car truck and resting on said lower members of the side frames, a bolster arranged parallel to the laminated spring, and additional springs positioned in the bolster opening of said side frames, all of said springs resiliently supporting said bolster.

4. In a railway car truck comprising side frames having upper and lower members connected by column members to form a bolster opening, a laminated spring positioned transversely of the car truck and resting on said lower members of the side frames, a bolster arranged parallel to the laminated spring, and additional springs positioned in the bolster opening of said side frames, all of said springs resiliently supporting said bolster, said bolster resting on the laminated spring at spaced points.

5. In a railway car truck comprising side frames having upper and lower members connected by column members to form a bolster opening, a laminated spring positioned transversely of the car truck and resting on said lower members of the side frames, a bolster arranged parallel to the laminated spring, and additional springs positioned in the bolster opening of said side frames, all of said springs resiliently supporting said bolster, said bolster being provided with a recess for partially housing the laminated spring.

6. In a railway car truck comprising side frames having upper and lower members connected by column members to form a bolster opening, a laminated spring positioned transversely of the car truck and resting on said lower members of the side frames, a bolster of substantially inverted U-shape having a recess in its bottom partially housing said laminated spring, and additional springs positioned in the bolster opening of said side frames, all of said springs resiliently supporting said bolster.

7. In a railway car truck comprising side frames having upper and lower members connected by column members to form a bolster opening, a laminated spring positioned transversely of the car truck and resting on said lower members of the side frames, a band surrounding the spring, a bolster resting on the spring, and a housing associated with the bolster and having a recess to accommodate said spring, said housing being provided with a second recess to accommodate said band.

8. In a railway car truck comprising side frames having upper and lower members connected by column members to form a bolster opening, a laminated spring positioned transversely of the car truck and resting on said lower members of the side frames, a band surrounding the spring, and a bolster resting on the spring and forming a housing adapted to accommodate said spring, said bolster being provided with a recess to accommodate said band.

9. In a railway truck comprising side frames having upper and lower members connected by column members to form a bolster opening, a laminated leaf spring positioned transversely of the car truck and resting on said lower members of the side frames, one end of said spring being interlocked with the side frame by a rocking joint.

10. In a car truck having side frames, said frames comprising top, bottom and column members defining bolster openings, a bolster having its ends extending into said openings, a laminated leaf spring positioned transversely of the car truck, supporting said bolster and resting on the side frames, one end of the spring and one of the side frames being interlocked with one another by abutting convex and concave surfaces forming a rocking joint.

11. In a car truck having side frames, said frames comprising top, bottom and column members defining bolster openings, a bolster having its ends extending into said openings, a laminated leaf spring positioned transversely of the car truck, supporting said bolster and resting on the side frames, one end of the spring and one of the side frames being interlocked with one another by abutting convex and concave surfaces forming a rocking joint, said surfaces being shaped to permit lengthwise movement of the spring relatively to the last mentioned side frame.

12. In a railway car truck comprising side frames having upper and lower members connected by column members to form a bolster opening, a laminated spring positioned transversely of the car truck and resting on said lower members of the side frames, a bolster, spring supports supported by the side frames, and other springs resting on said spring supports, all of said springs resiliently supporting said bolster.

13. In a railway car truck comprising side frames having upper and lower members connected by column members to form a bolster opening, a laminated spring positioned transversely of the car truck and resting on said lower members of the side frames, a bolster, spring supports detachably connected with the side frames, and other springs resting on said spring supports, all of said springs resiliently supporting said bolster.

14. In a railway car truck comprising side frames having upper and lower members connected by column members to form a bolster opening, a laminated spring positioned transversely of the car truck and resting on said lower members of the side frames, a bolster, spring supports resting on the side frames, interlocking elements on the side frames and said supports detachable from one another by relative movement between the supports and side frames, and other springs carried by said supports, all of said springs resiliently supporting said bolster.

15. In a car truck having side frames, each frame having upper and lower members connected by column members to form a bolster opening, said lower members being provided with a concave surface, a laminated leaf spring positioned transversely of the car truck and having its ends extending into said openings and resting on said lower members, each end of the spring being provided with a convex surface interlocked with the concave surface on the lower members of said side frames.

16. A car truck spring housing member having leaf spring elements projecting from its ends, and upstanding extensions on said housing forming seats for a bolster.

17. In a car truck, the combination with a side frame having a spring seat portion provided with an aperture, of a cap resting on said spring seat portion and interlocked with said opening, said cap forming a full bearing for the end of a leaf spring, and a spring seat positioned on said seat portion for supporting other springs at a higher level than said leaf spring, said spring seat having a portion overhanging said cap and spaced from the latter to receive and cover said end of the leaf spring.

18. A car truck comprising side frames having bolster openings, a leaf spring structure arranged transversely of the truck and extending from one side frame to the other and having its ends resting on the side frames, coil springs in the bolster openings and supported by the side frames, a bolster supported by the laminated spring structure and by the coil springs, said coil springs operating in unison or parallel with said laminated springs.

19. A car truck comprising side frames, a laminated spring structure arranged transversely of the truck and having its ends resting on the side frames, said spring structure forming an element which may be substituted for a conventional spring plank.

20. A railway car truck comprising side frames having bolster openings, a laminated spring structure arranged transversely of the truck and having its ends extending into the bolster openings and supported by the side frames, other springs in the bolster openings and supported by the side frames, and a bolster having its ends resting on the last mentioned springs and its medial portion resting on the laminated spring structure.

21. A railway car truck comprising side frames having bolster openings, a laminated spring structure arranged transversely of the truck and having its ends extending into the bolster openings and supported by the side frames, other springs in the bolster openings and supported by the side frames, and a bolster having its ends resting on the last mentioned springs and its medial portion resting on the laminated spring structure, said bolster being of conventional design.

22. A railway car truck comprising side frames having bolster openings, a laminated spring structure arranged transversely of the truck and having its ends extending into the bolster openings and supported by the side frames, other springs in the bolster openings and supported by the side frames, and a bolster having its ends resting on the last mentioned springs and its medial portion resting on the laminated spring structure, each side frame being of conventional design.

23. In a car construction of the kind described and in combination, a pair of truck side frames each having an opening and provided with truck spring seats arranged therein and resting on the frame; springs carried by said seats, a truck bolster projected into said openings and carried by said springs, and means extending into said truck spring seats immediately below the said springs and engaging the bolster intermediate the ends thereof for supporting the bolster and absorbing the vertical shocks to the truck.

24. In a car construction of the kind described and in combination, a pair of truck side frames each provided with an opening through the same, spring seats arranged in said openings and carried by said frames, springs carried by said seats, a truck bolster arranged between said frames with its ends positioned within said openings, said spring seats provided with recesses at the inner sides thereof, a semi-elliptical spring construction arranged below said bolster with the spring ends extending into the recesses in said spring seats, said spring construction engaging the bolster at the under side intermediate the ends thereof and supporting the same thereat.

CHARLES B. GOODSPEED.